Figure 1:
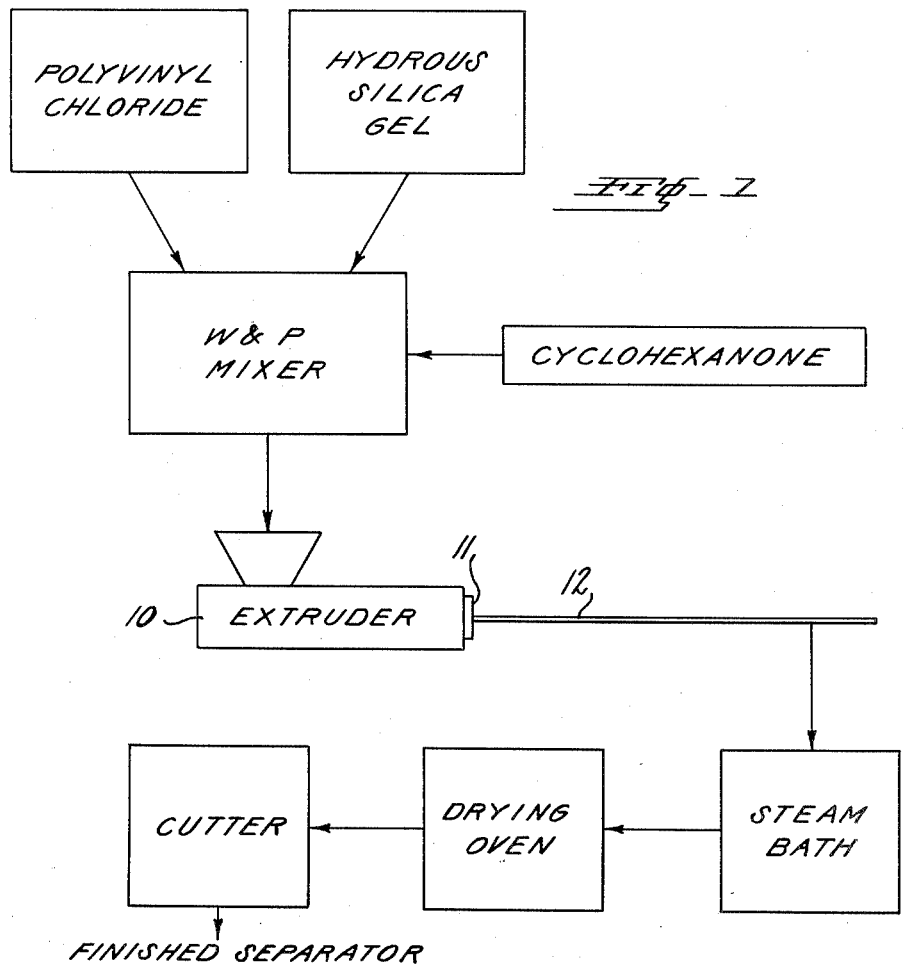

INVENTORS
HARRY S. WITT
FRANK S. MARTIN

United States Patent Office 2,772,322
Patented Nov. 27, 1956

2,772,322

MICROPOROUS VINYL CHLORIDE RESIN AND METHOD OF MAKING SAME

Harry S. Witt, East Paterson, N. J., and Frank S. Martin, Cranston, R. I., assignors to United States Rubber Company, New York, N. Y., a corporation of New Jersey Application August 5, 1953, Serial No. 372,466

8 Claims. (Cl. 136—146)

This invention relates to a new method of making microporous sheet material such as separators for electric storage batteries, and more particularly it relates to an improved method of making sheets of microporous resinous vinyl chloride polymer, and to the improved microporous sheets so made.

A principal use of the microporous sheet material of the invention is in electrical storage batteries. As is well known, electrical storage batteries are commonly provided with separators, in the form of thin sheets, that are fitted in between the electrodes of the battery to maintain the plates in proper spaced relation, to prevent adjacent plates from touching and thereby causing short circuits, and at the same time to permit circulation of the electrolytic medium and escape of gas produced by the electrolytic process. The separators must of course be of insulating material, and they must be sufficiently porous to allow ionic migration between the plates through the electrolytic medium, which must permeate the separators. The requirements of the separators in this respect are quite exacting, in that the pores in the separators must not be of sufficient size to allow particles of solid matter to enter into or pass through the separators, and at the same time the pores must not be so few or so small as to occasion undue resistance to the flow of electric current. In general, the desired condition is a high degree of porosity, with pores of microscopic or sub-microscopic size.

Previously known methods of making microporous battery separators have had certain disadvantages, in that the processes were time consuming, inconvenient, or difficult to control, or led to final products that were not entirely satisfactory from the standpoint of physical properties and performance. The present invention has for its principal object the amelioration of the foregoing difficulties.

According to the invention, a resinous vinyl chloride polymer is mixed with silica hydrogel and a volatile organic solvent for the resin to form a heavy paste or dough, which is shaped into the form of a sheet, whether ribbed or not, by any suitable method, such as by calendering on a smooth or a profile calender, or by extruding the mixture through an appropriately shaped die or by shaping the mixture in a suitable mold. The solvent is thereafter removed from the shaped mixture under such conditions that the water is not removed from the hydrous silica gel. The water must be maintained in the pores of the silica gel until sufficient solvent has been removed to make the polymer matrix rigid and form-sustaining. In this way excessive shrinkage of the mass and consequent reduction in porosity of the final product are avoided. After sufficient solvent has been removed to render the mass rigid, the mass is dehydrated, with the result that innumerable interconnecting submicroscopic pores are left permeating the mass.

The new microporous sheet material made by the process of this invention is comprised of a continuous matrix of vinyl chloride polymer permeated throughout by interconnecting pores, said pores containing particles of non-vitreous, friable, dehydrated silica hydrogel.

The volume occupied by the dehydrated silica hydrogel particles is only a minor portion of the total volume of the pores or cells developed within the vinyl chloride polymer matrix during the process. As a consequence, the present microporous sheet material is characterized by the fact that a high proportion of the volume of the sheet is occupied by the electrolyte when the sheet is used as a battery separator, and the silica gel particles offer substantially no obstruction to the flow of the electric current. This condition is reflected in the improved electrical properties of battery separators made of the present material.

Another characteristic of the microporous vinyl chloride resin sheet material of the invention is that the polymer forms a firmly interconnected, strong, continuous matrix, the silica gel particles having no structural function in the finished sheet, so that the strength of the sheet is entirely independent of any adherence between the dehydrated silica gel particles and the vinyl chloride resin.

Figure 2:
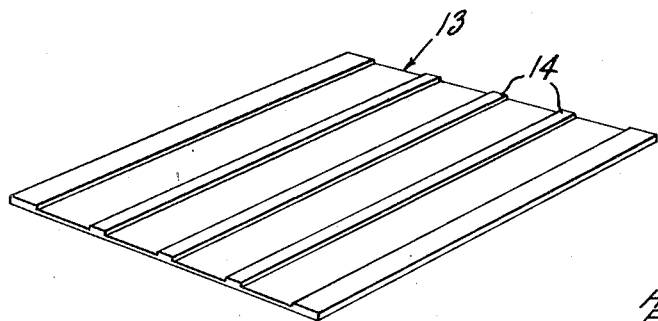

The invention will be described in more detail with reference to the accompanying drawing, wherein:

Fig. 1 is a flow diagram showing the essential steps in one method of practicing the invention in conjunction with the manufacture of battery separators; and Fig. 2 is a perspective view of a battery separator made thereby.

The vinyl chloride polymer employed in the invention is preferably the ordinary unplasticized, hard, gamma vinyl chloride homopolymer resin of commerce. In practice, the vinyl chloride polymer is sometimes modified somewhat in properties by copolymerizing the vinyl chloride with a small amount (e. g. up to 15%) of a copolymerizable monoethylenically unsaturated monomer, usually vinyl acetate, although vinylidene chloride is also used for this purpose. A somewhat similar modification of the physical properties of the resin may sometimes be achieved by adding a small amount of such a polymer as polyvinyl acetate to the polyvinyl chloride. The resin may be compounded with the usual stabilizing or other modifying ingredients, and it is sometimes advantageous to include suitable amounts, say 10 parts, of an appropriate filler, such as cotton floc. Cotton floc is capable of increasing the strength of the final sheet, as well as lowering the electrical resistance of the sheet. For the sake of convenience and brevity, the various foregoing compounded resinous materials will be referred to hereinafter as vinyl chloride resins.

The silica hydrogel employed is made by the partial dehydration of freshly precipitated silica acid gels to a solids content of about 20 to 45%. To obtain maximum efficiency from as high a water content as is consistent with good processing, it is preferred to use silica gel containing from 36 to 40% solids. The gel may be easily ground to the desired particle size, for example, from 30 to 300 mesh, and it is preferred to use gel in the range of 60 to 80 mesh. It is non-vitreous, and possesses friability and the capability of undergoing extensive shrinkage upon further dehydration. As a first step in one method of preparing the friable silica hydrogel employed, a gelatinous precipitate containing, for example, 5% solids and 95% water is made by well-known chemical methods. The gelatinous precipitate is partially dehydrated by any convenient method such as by pressing and/or drying on trays. The change from a semi-fluid gelatinous state to a free-flowing particulate state occurs at an $SiO_2$ content of about 15%. Other methods of making a suitable silica hydrogel are known.

The vinyl chloride resin and the hydrous silica gel are preferably mixed together before the solvent is added, because in this manner a powerful grinding action is developed as soon as the addition of the solvent is begun and the material knits together. This continues throughout the mixing cycle and is believed to be responsible in large part for the unusually rapid mixing obtained. The ratios of vinyl chloride resin to silica hydrogel that can most advantageously be employed are from 1:6 to 1:4, a ratio of about 1:5 being preferred.

The solvent employed is one having appreciable solvent and plasticizing action on the vinyl chloride resin. Solvents in which the vinyl chloride resin is soluble to the extent of at least 20 or 25% are most suitable for this purpose. It is also desirable that the solvent have at least a limited affinity for water, to facilitate good dispersion of the hydrous silica gel in the mass. Solvents that are soluble in water to the extent of about 2% to 20% fulfill the latter requirement most suitably. Solvents that are miscible with water in all proportions are not especially suitable for the calendering or extrusion processes but may be used better in the molding process. The amount of solvent used is from 20% to 30% of the entire composition including the solvent, 25% being preferred.

Cyclohexanone fulfills the foregoing requirements particularly well, and therefore it is the preferred solvent. Cyclohexanone properly plasticizes the polyvinyl chloride at a satisfactorily low total liquid content in the mix, and it is only slightly soluble in water; it is able to produce a good dispersion of the silica gel, such as is not obtainable with solvents that are totally insoluble in water. The amount of cyclohexanone used is, suitably, from 20% to 30% of the entire composition, 25% being preferred. In a less preferred form of the invention the cyclohexanone is replaced by methyl cyclohexanone or in part by methyl ethyl ketone or methyl isopropyl-ketone to the extent of less than about 25% of the total solvent, preferably less than 10%. Because of the greater water solubility of the acyclic ketones, too much of such ketone produces weakening of the dough and causes difficulty in sheet formation. Less satisfactory results are obtained with other solvents, including chlorobenzene and nitrobenzene. Another suitable solvent that may be mentioned is tetrahydrofuran, but this solvent is miscible with water in all proportions and it therefore is less preferred.

The mixing may be effected in an internal mixer, such as one of the Werner and Pfleiderer type, or an extruder type of mixer. If desired, the vinyl chloride resin may be added to the solvent, blended, and then the silica hydrogel may be added. However, as indicated previously, it is preferred to mix the silica gel with the vinyl chloride resin and then add the solvent, because complete mixes are obtained in shorter times by this procedure. In the course of the mixing operation the solvent forms a viscous, dough-like solution of the vinyl chloride resin, and the fine particles of hydrous silica gel become thoroughly dispersed therein. The dough may be formed into the desired shape by any suitable method, such as molding, extrusion, or calendering. Extrusion and calendering represent preferred methods of shaping the dough in sheet form, and they can be carried out to greatest advantage when the preferred solvent is used. Extrusion is the most preferred method because the stock may be kept cleaner and evaporation losses may be minimized. When using the less preferred solvents, such as nitrobenzene, chlorobenzene and tetrahydrofuran, the sheet is more suitably formed by molding. In the course of the shaping step, the sheet may be given any desired configuration, whether planar or whether provided with continuous or interrupted ribs or other protrusions. In the case of certain electrolytic diaphragms the material may be shaped in the form of a cylinder or cup.

Following formation of the sheet, the solvent is removed in such a manner that there is no accompanying loss of water from the sheet. This is best achieved by carrying out the solvent removal under such conditions that the surrounding atmosphere is saturated with water vapor. Boiling in water is an acceptable method, but requires a comparatively long time. Treatment in saturated steam at atmospheric pressure has proved to be the most feasible means. It will be understood that when we refer to solvent removal in an atmosphere saturated with water vapor we mean this to include the use of boiling water and/or saturated steam.

In the accompanying drawing one typical method of manufacturing battery separators in accordance with the invention is depicted. The mix is represented in Fig. 1 as being shaped by an extruder 10, provided with a shaping die 11, into the form of a continuous, thin ribbed sheet 12, which is then run through a steam bath and a drying tunnel, as described below. The sheet may then be cut to size suitable for use in storage batteries. As indicated in Fig. 2, the separators 13 are provided on one surface with a series of parallel outstanding ribs 14. In the course of the extrusion, the mixed stock may be fed into a screw type of extruder in the usual manner. The stock and the extruder barrel may be at room temperature or they may be heated slightly above room temperature, for example, to 100–110° F., to facilitate the movement of the stock, which contains a minimum amount of cyclohexanone or other solvent and is therefore quite stiff.

As indicated above, the solvent must be removed under non-evaporative conditions with respect to water, so as to avoid excessive shrinkage. Unless water is maintained in the pores until sufficient solvent has been removed to make the vinyl chloride resin matrix rigid and form-sustaining, shrinkage will occur and the porosity will diminish. Thus, if the solvent is removed in an atmosphere of low relative humidity, shrinkage will occur and the porosity will diminish. In extreme cases, shrinkage may occur to such an extent that the residual pores become virtually non-interconnecting. In such cases the electrical resistance becomes very high and the product is worthless as a battery plate separator.

*Example*

Silica hydrogel (60–64% moisture), 250 parts (by weight), and Marvinol VR–10 (a commercial grade of polyvinyl chloride), 50 parts, were mixed for one minute in a Werner and Pfleiderer mixer; 100 parts of cyclohexanone were added slowly and the total mixed for five minutes. The resulting dough was removed from the mixer and was calendered as flat sheet .030" in thickness. The sheet was cut into three-foot lengths. These were then placed in a steam bath and heated at 212° F. in the steam for 20 minutes, to remove the cyclohexanone, and then they were removed and dried in a current of air in an oven at 150° F. for one hour. The dried sheets were then cut to size. The finished sheets have: voids, 65% or more; electrical resistance, not exceeding 0.040 ohm for one square inch; tensile strength, in excess of 200 pounds per square inch; impact strength (unnotched Izod), nearly one foot-pound per inch square.

From the foregoing, it will be apparent that the improved method of the invention offers a number of important advantages over previously known ways of making battery separators. Because of the ease with which the initial materials may be mixed together, the mixing process requires comparatively little time—a five-minute mixing period is usually more than ample—and the mixing is easily carried out continuously if desired, along with continuous extrusion or sheeting of the mixed mass.

It is also important to note that the process of the invention requires no prolonged vulcanization or curing step, unlike certain prior art processes. Instead, the vinyl chloride resin, being readily soluble in the solvent used, swells in the solvent and forms a continuous matrix, into which the hydrous silica gel particles are dispersed. To make the vinyl chloride polymer matrix form-sustaining it is simply necessary to remove the solvent. When the removal of the solvent is accomplished by heating the shaped mass in water or in an atmosphere of saturated steam, it is found that a slight, uniform shrinkage occurs which is dependent upon the composition of the dough; in the example above the shrinkage is of the order of 5%. The process is easily controlled, because there is no difficulty about under-curing or over-curing, as ther is with certain prior art processes.

Another advantageous feature of the present process is that the desired pores are formed in the vinyl chloride resin by a simple dehydration step. In a prior process utilizing starch and polyvinyl chloride, prolonged extraction or digestion steps are necessary to produce the desired voids. In the present process, simple removal of the water from the hydrous silica gel by rapid evaporation results in the production of numerous interconnecting pores of microscopic size, no leaching being required. Because the hydrous silica gel shrinks extensively on dehydration the pores in the finished dry separator are only partially filled with the shrunken, friable particles of dehydrated gel. In the mixing of the swollen vinyl chloride polymer with silica gel, or in the subsequent processing, two continuous intermeshed phases are produced: the hydrous silica gel phase, and the vinyl chloride polymer phase. On dehydration of the silica gel, the gel particles shrink and are left entrapped in the pores of the rigid vinyl chloride resin phase, but the strength of the sheet is in no way dependent upon any adherence of the particles to the vinyl chloride resin matrix. The microporous material of the invention is therefore non-brittle and much stronger than certain prior art microporous sheets in which the silica gel particles are an indispensable part of the rigid structure and which accordingly depend upon a bond between the silica gel particles and a binding resin for their structural strength. In such prior art microporous sheets, the structure would collapse upon leaching out of the silica gel particles, whereas the present separator retains its strength if the silica gel is removed. The present microporous material therefore has essentially the same strength as the vinyl resin itself. Because of its superior strength, the present microporous sheet material is well adapted for use in filtration operations, where the sheet might be required to withstand considerable pressure.

Because the shrunken silica gel particles remain entrapped in the pores of the present microporous sheet, the sheet is stiff, compared to the sheets made by the starch-leaching process. Because the silica gel is hydrophilic, battery separators made of the present material require no prolonged treatment with a wetting agent, and they are permanently wettable. They can be wetted and dried repeatedly without showing any loss in wetting characteristics or of electrical conductivity. In the separators made by the starch-leaching method, it is necessary to subject the separator to a prolonged treatment by a wetting agent, to render it wettable by the battery acid. Such separators if wetted and dried repeatedly take up acid slowly and incompletely after the first wetting, resulting in high electrical resistance in the battery unless they are re-treated with wetting agent in or after each wetting and drying cycle.

The separator made in accordance with the present process has desirably low electrical resistance, which is retained throughout prolonged periods of service. The low electrical resistance of the present microporous sheets is in no small part due to the fact that the dehydrated silica gel particles occupy only a minor portion of the volume of the pores formed in the vinyl chloride polymer matrix, as explained previously. The separators are also dimensionally stable, retaining the precise desired shape and size throughout their useful life.

Having thus described our invention, what we claim and desire to protect by Letters Patent is:

1. A method of making a microporous material comprising the steps of mixing a resinous vinyl chloride polymer, silica hydrogel containing 55 to 80% water, and a volatile organic solvent for the resin to form a dough-like mass, shaping the resulting mass into a desired form, removing the said solvent from the shaped mass, said removal being carried out in an atmosphere saturated with water vapor to avoid water removal from the silica gel, thereby fixing the mass in the said desired form while the said water is still present in the gel, and subsequently dehydrating the silica gel for such a length of time and temperature as to cause the gel to shrink within said mass and to provide microporous voids within the mass, said mass having a resulting porosity of at least 65%.

2. A method of making a battery plate separator comprising the steps of thoroughly mixing particulate polyvinyl chloride with silica hydrogel containing 40 to 60% water and cyclohexanone, shaping the resulting dough into the form of a battery plate separator, removing the cyclohexanone from the shaped mix, said removal being carried out in an atmosphere saturated with water vapor to avoid water removal from the silica gel, thereby fixing the mass in the said form while the said water is still present in the gel, and thereafter dehydrating the silica gel for such a length of time and temperature as to cause the gel to shrink within said mass and to provide microporous voids within the mass, said mass having a resulting porosity of at least 65%.

3. A method of making a microporous sheet comprising the steps of thoroughly mixing polyvinyl chloride with silica hydrogel containing 55 to 80% water, and thereafter adding and uniformly blending a volatile organic solvent for the polyvinyl chloride in which the polyvinyl chloride is soluble to the extent of at least 20%, and which is soluble in water to the extent of from 4% to 20%, extruding the resulting plastic mass in the form of a battery plate separator, removing the volatile organic solvent from the separator, said removal being carried out in an atmosphere saturated with water vapor to avoid water removal from the silica gel, thereby fixing the mass in the said desired form while the said water is still present in the gel, and subsequently dehydrating the silica gel for such a length of time and temperature as to cause the gel to shrink within said mass and to provide microporous voids within the mass, said mass having a resulting porosity of at least 65%.

4. A method of making battery plate separator comprising the steps of thoroughly mixing polyvinyl chloride with hydrous silica gel containing 60 to 64% water and cyclohexanone, shaping the resulting dough into a form having the contour of a battery plate separator, exposing the shaped mix to saturated steam to remove the cyclohexanone therefrom without concurrently removing water from the silica gel, thereby fixing the mass in the said desired form while the said water is still present in the gel, and thereafter dehydrating the silica gel for such a length of time and temperature as to cause the gel to shrink within said mass and to provide microporous voids within the mass, said mass having a resulting porosity of at least 65%.

5. A method of making a battery plate separator comprising the steps of blending particulate vinyl chloride resin with hydrous silica gel containing 55 to 80% water, thereafter blending cyclohexanone with the resulting mixture to form a dough-like mixture, extruding the dough-like mixture into a form having the contour of a battery plate separator, exposing the separator to a saturated steam to remove the cyclohexanone therefrom without removing water from the silica gel, thereby fixing the mass in the said desired form while the said water is still present in the gel, and subsequently dehydrating the silica gel by such a length of time and temperature as to cause the gel to shrink within said mass and to provide microporous voids within the mass, said mass having a resulting porosity of at least 65%.

6. A method of making a battery plate separator comprising the steps of blending particulate polyvinyl chloride with hydrous silica gel containing 60 to 64% water, thereafter blending cyclohexanone with the resulting mixture to form a dough-like mixture, extruding the dough-like mixture into a form having the contour of the battery plate separator, exposing the separator to saturated steam to remove the cyclohexanone therefrom without removing water from the silica gel, thereby fixing the mass in the said desired form while the said water is still present in the gel, and subsequently drying the separator by passing air over it at a temperature of about 150° F. to dehydrate the silica gel and form a separator having microporous voids throughout and a porosity of at least 65%.

7. A microporous sheet consisting of a continuous matrix of a resinous vinyl chloride polymer uniformly permeated throughout by interconnecting pores containing particles of porous dehydrated silica gel occupying a minor volume of the space in said pores, said sheet having a porosity of at least 65%, and being characterized by the ability to be repeatedly wetted and dried by reason of the hydrophilic nature of the said gel.

8. A battery plate separator consisting of a continuous matrix of polyvinyl chloride permeated throughout by interconnecting pores containing particles of non-vitreous, friable, porous dehydrated silica hydrogel occupying a minor volume of the space in said pores, said separator having a resulting porosity of at least 65%, and being characterized by the ability to be repeatedly wetted and dried by reason of the hydrophilic nature of the said gel.

References Cited in the file of this patent

UNITED STATES PATENTS

| | | |
|---|---|---|
| 1,665,604 | Norris et al. | Apr. 10, 1928 |
| 2,302,833 | Behrman | Nov. 24, 1942 |
| 2,542,527 | Honey et al. | Feb. 20, 1951 |
| 2,591,754 | Wilson et al. | Apr. 8, 1952 |
| 2,653,987 | Baty | Sept. 29, 1953 |